June 26, 1951 T. S. VOSBIKIAN ET AL 2,558,697
BLADED TOOL
Filed May 16, 1947
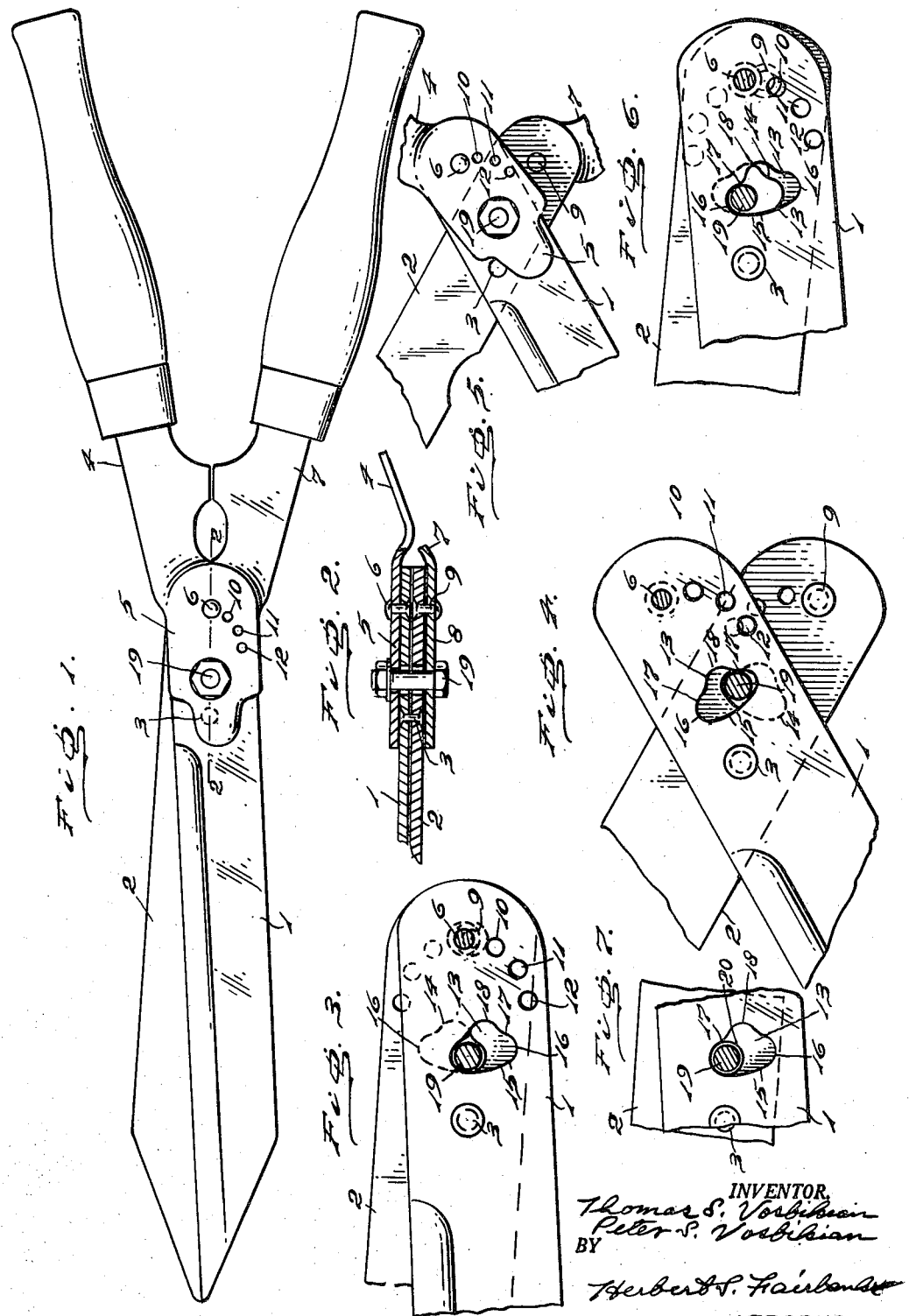
INVENTOR.
Thomas S. Vosbikian
Peter S. Vosbikian
BY
Herbert S. Fairbanks
ATTORNEY.

Patented June 26, 1951

2,558,697

UNITED STATES PATENT OFFICE 2,558,697

BLADED TOOL

Thomas S. Vosbikian and Peter S. Vosbikian,
Melrose, Pa.

Application May 16, 1947, Serial No. 748,504

7 Claims. (Cl. 30—266)

In our prior Patent No. 2,248,796 of July 8, 1941, we have described and broadly claimed a bladed tool having a novel cam action for increasing the leverage on the blades.

Our present invention has been devised to improve the cam action and provide a smoother and more powerful cutting action or holding action depending on the character of the co-operating edges of the blades.

The blades may be adapted for cutting and in the form of many different types of shears, such as grass shears, hedge shears, tinners' snips, scissors, pruning shears, and other types of bladed members for cutting; or the blades may be adapted for holding or gripping in the form of pliers, wrenches, hand vises and similar tools.

The cam slots cooperating with a cam pin are constructed and arranged in a novel manner to provide a very efficient bladed tool.

With the foregoing and other objects in view as will hereinafter clearly appear, our invention comprehends a novel bladed tool having a novel cam action.

Our invention further comprehends a novel bladed tool having the blades pivoted together to form a fixed pivot, with the inner ends of the blades pivoted to handles, and with each blade having between the blade and handle pivots an offcenter cam slot through which a cam pin fixed to the handles extends.

It further comprehends a novel arrangement of the handle pivots with the blades to provide a desired leverage action on the blades.

For the purpose of illustrating the invention, we have shown in the accompanying drawings a preferred embodiment of it which we have found in practice to give satisfactory and reliable results. It is, however, to be understood that the various instrumentalities of which the invention consists can be variously arranged and organized and the invention is not limited to the exact arrangement and organization of these instrumentalities as herein set forth.

Figure 1 is a top plan view of a bladed tool embodying our invention and illustrated as in the form of hedge shears.

Figure 2 is a section on line 2—2 of Figure 1.

Figure 3 is a plan view of the blades in their closed positions, with the handles removed and the cam pin in section.

Figure 4 is a plan view similar to Figure 3 but showing the blades in their open positions.

Figure 5 is a plan view showing a portion of the handles with the blades in open positions.

Figure 6 is a plan view of the blades with the cam pin in section showing more particularly the cam action of the cam pin and the cam slots during the closing movement of the blades.

Figure 7 is a plan view of a modified form.

Similar numerals of reference indicate corresponding parts.

Referring to the drawings:

Blades 1 and 2 are pivoted together at 3 to form a fixed pivot for the turning movement of the blades.

A handle 4 has a bearing plate portion 5 at its forward end which is pivoted at 6 to the blade 1. In a similar manner, a handle 7 has a plate portion 8 pivoted at 9 to the blade 2.

We have found as a result of numerous experiments that the cutting or gripping power of a tool of this character can be progressively increased by locating the handle pivots off-center of the longitudinal axis of a blade as shown by a plurality of pivot receiving openings 10, 11 and 12 at different distances from the fixed pivot 3.

The blades, as to their pivot openings and cam slots, are of the same construction, the blade 1 having a cam slot 13 and the blade 2 having a cam slot 14. These cam slots are of novel construction and arrangement. Each cam slot has a forward curved wall 15 extending transversely of its blade and merging into rounded side walls 16. The walls 16 merge into cam walls 17 connected by the inner curved wall 18.

A single cam pin 19 in the form of a bolt passes through the bearing plates 5 and 8 and through the cam slots 13 and 14, and serves as the sole means for retaining the blades and handles in assembled condition, it being noted that the ends of the fixed pivot 3 are flush with the outer faces of the blades and the same holds true as to the handle pivots.

The operation will now be apparent to those skilled in this art and is as follows:

The cam pin 19 has a close fit in the handle bearing plates but provides for their relative movement.

The cam slots are disposed transversely of their blades and incline rearwardly from the median line of the pivots towards a side of the blade.

If the handles are in closed position and are moved outwardly away from each other to open the blades, the opening movement is limited by the cam pin engaging the rounded side walls 16 of the cam slots which at such time form with each other a substantially closed, round opening through the blades, see Fig. 3.

When the handles are moved towards each other to cause the initial closing movement of the blades, the blades turn on the fixed pivot 3 to engage the work. The cam pin 19 moves laterally in the cam slots into contact with the cam walls 17, thus effecting by a cam action the final closing movement of the blades. Since the cam pin is positioned in close proximity to the fixed pivot, such cam action imparts a very powerful leverage to the blades.

The handles are pivoted to their blades and the handle carries the fixed pivot pin 19 which moves freely in the cam slots of the blades as the handles are moved. The blades, however, move on their fixed pivot 3. The result is that the cam pin has a sliding movement in the cam slots and as the blades close slides on the cam wall 17 of each blade. The curved wall 18 and also the curved wall 15 of the cam slots permit a freer movement of the cam pin without the cam pin becoming wedged or locked in the cam slots.

By having the pivotal connection of the handles with the rear ends of the blades offcenter, the stroke of the blades may be varied but the cam action is the same. When the handles are turned, the cam pin moves with them, but the swinging movement of the blades is on the fixed pivot 3.

The fixed pivot 3 is preferably in the form of a rounded rod or pin and the handle bearing plates overhang such rod or pin.

It will be noted that the bearing plates, for example the bearing plate 5, in the open position of the blade 1 is out of alignment with the longitudinal axis of such blade, see Figure 5, but when the blades are closed assumes the position seen in Figure 1 with respect to its blade.

The cooperating marginal portions and cutting or gripping edges of the blades may have any desired configuration.

In the embodiment of the invention shown in Figures 1 to 6 inclusive, the cam action is provided for both blades, while in Figure 7 the cam action is provided for only one of the blades and the cam pin has a working fit in the other blade. For purpose of illustration, the blade 1 has been shown as having a cam slot 13 of the same construction and arrangement as that described, but the other blade has an opening 20 in which the cam pin has a working fit. The handles are connected with the blades in the manner already described. The cam action of the cam wall 17 with the cam pin 19 is thus effected by the closing movement of one blade relatively to the other.

Having thus described our invention, what we claim as new and desire to secure by Letters Patent is:

1. A bladed tool, comprising blades having a fixed pivot near their inner ends, each blade having a cam slot in rear of the fixed pivot, the front wall of each cam slot being curved, extending transversely of the blade, and merging at the sides into rounded walls, which latter merge into rearwardly and inwardly inclined cam walls, handles having bearing plates pivoted to the blades in rear of their cam slots, and a cam pin carried by said bearing plates, passing through the cam slots and cooperating with cam walls of the cam slots during the closing movement of the blades.

2. The construction specified in claim 1 wherein the cam slot of a blade begins at the median line of the fixed pivot and cam pin when the blades are closed, and inclines rearwardly and laterally towards the adjacent side of its blade.

3. A bladed tool, comprising blades having a fixed pivot, each blade having a cam slot in rear of the fixed pivot, the front wall of each slot curving laterally and outwardly and merging into rounded walls, which latter merge into cam walls, handles for the blades, and a cam pin carried by the handles and passing through the cam slots, said handles being pivoted to the blades off-center of the median line of the cam pin and fixed pivot towards the outer side edge of the blade.

4. The construction set forth in claim 3 wherein the fixed pivot is off-center of the blades towards their cooperating marginal portions.

5. A bladed tool, comprising blades pivoted together near their inner ends and each having a cam slot in proximity to said pivot, the front wall of each cam slot curving transversely of its blade and located off-center of the longitudinal axis of its blade and the rear wall of each cam slot having a cam wall extending at an angle to the longitudinal axis of its blade, handles connected with the rear ends of the blades, and a cam pin fixed to the handles and passing through said cam slots.

6. A bladed tool, comprising blades pivoted together near one end, one of said blades having a cam slot in proximity to said pivot, the front wall of said slot extending transversely of the blade to merge at the sides into rounded walls which latter merge into cam walls disposed at an angle to and extending inwardly towards the median line of its blade, handles connected with ends of the blades, and a cam pin carried by the handles extending through the cam slot of one blade and through the other blade, and cooperating with said cam walls.

7. A bladed tool comprising blades pivoted together near one end, one of said blades having a cam slot extending from the median line of the blade towards the outer marginal portion of the blade and having a cam wall near said median line, the other blade having an opening in register with said cam slot, a cam pin having a working fit in said opening and extending through said slot, and handles connected with said blades and carrying said cam pin.

THOMAS S. VOSBIKIAN.
PETER S. VOSBIKIAN.

REFERENCES CITED

The following references are of record in the file of this patent:

UNITED STATES PATENTS

| Number | Name | Date |
| --- | --- | --- |
| 2,073,460 | Vosbikian et al. | Mar. 9, 1937 |
| 2,248,796 | Vosbikian et al. | July 8, 1941 |